United States Patent [19]
Walker

[11] 4,172,470
[45] Oct. 30, 1979

[54] SOFT SEAT VALVE

[75] Inventor: James V. Walker, Redondo Beach, Calif.

[73] Assignee: McDonnell Douglas Corporation, Long Beach, Calif.

[21] Appl. No.: 912,081

[22] Filed: Jun. 2, 1978

[51] Int. Cl.$^2$ ............................................. F16K 15/00
[52] U.S. Cl. ........................ 137/516.29; 137/543.23; 251/DIG. 1
[58] Field of Search .................. 137/472, 516.29, 508, 137/516.13, 516.15, 543.23; 251/DIG. 1

[56] References Cited
U.S. PATENT DOCUMENTS

| | | |
|---|---|---|
| 2,469,921 | 5/1949 | Hoge ............................. 251/DIG. 1 |
| 2,481,482 | 9/1949 | Green ........................... 251/DIG. 1 |
| 3,036,593 | 5/1962 | Saville .............................. 137/508 X |

Primary Examiner—Harold W. Weakley
Attorney, Agent, or Firm—Paul T. Loef; Walter J. Jason; Donald L. Royer

[57] ABSTRACT

A zero leakage valve, employing a radially squeezed elastomeric o-ring seal. In opening and closing, the o-ring is transferred from the valve element to a following retainer sleeve. The transfer is facilitated by relieving the squeeze on the o-ring coincidental with valve movement from closed to open positions. One embodiment is a dual element check valve employing the radial seal in conjunction with a conventional poppet and seat combination. The two valve elements act in a series arrangement.

3 Claims, 6 Drawing Figures

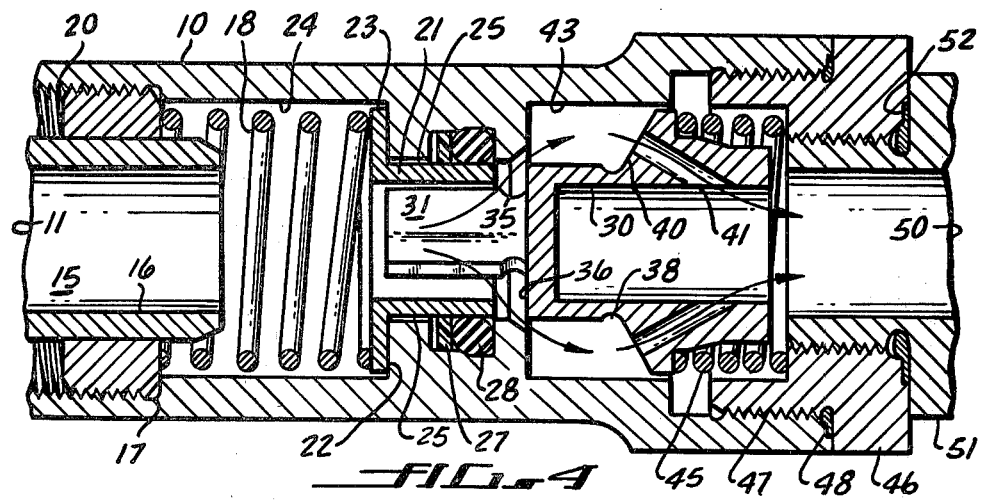
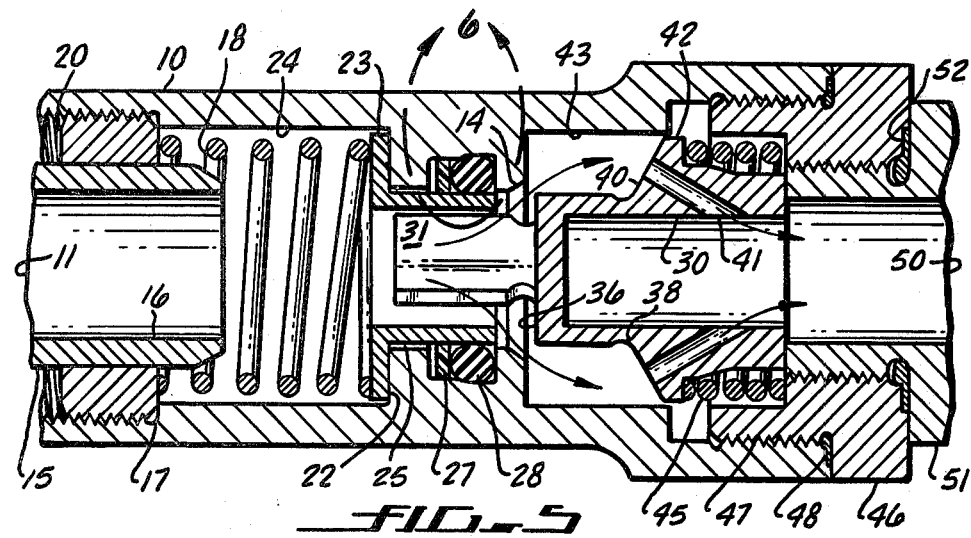
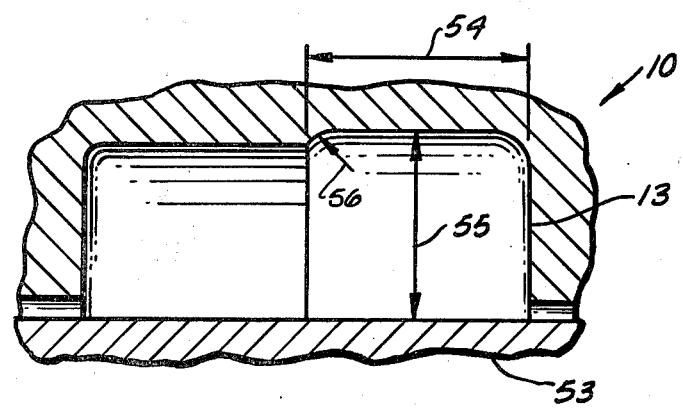

SOFT SEAT VALVE

BACKGROUND OF THE INVENTION

This invention relates to valves, and more particularly to valves employing radial sealing surfaces with resilient seals there-between. In the preferred embodiment, the radial seal is employed in conjunction with a conventional metal-to-metal poppet and seat arrangement to provide a dual acting check valve.

Some aircraft systems require the storage of energy in accumulators for emergency operation. Typically, these accumulators store hydraulic fluid under pressure by compressing a gas on one side of a piston or bladder and are charged automatically through check valves. It is essential that these check valves be leakproof or the charge of pressure will be lost and the system will not function when required. Somewhat similar systems employing high pressure pneumatics as the system muscle in missile and space applications also require zero leakage check valves.

The prior art reflects many attempts to develop zero leakage check valves employing resilient sealing means. All of these efforts are centered around face seal applications of the soft seal. The most popular approach has been a conical poppet, housing an o-ring, which mates against a tapered seat which is generally considered a face seal as opposed to a pure radial seal. In all these applications, no matter what novel means are employed to shroud the soft seal, the seal is exposed to some degree of fluid flow during opening and closing of the valve. Flow exposure tends to wash the seal from its containment groove which erodes the seal.

The most effective zero leakage check valve commercially available to date employs precision metal-to-metal, extremely hard, and optically flat sealing surfaces, one of which is provided with a pair of closely spaced, concentric, circular, sharp-edge, raised members. This valve, while enjoying a degree of success, is very expensive and will leak when the conditions are such that the valve seal closes slowly.

BRIEF SUMMARY OF THE INVENTION

The present invention is a zero leakage, high reliability valve employing a radially squeezed elastomeric o-ring with a teflon backup ring as the sealing means. When the valve is actuated from the closed to the open position a seal retaining sleeve follows and maintains contact with the valve element by means of biasing springs. As the valve element loses contact with the seal, the seal retaining sleeve picks up the seal to retain and protect the seal when the valve is in the open position. The valve element and the seal retaining sleeve act as one to permit the seal to shift its sealing contact from the valve element to the retainer and vice versa. To facilitate this transfer, the squeeze on the resilient seal is essentially reduced to zero at the point the seal retaining sleeve picks up the seal. This is accomplished by providing a gland in the valve body to house the resilient seal which is wider than the seal and provided with a stepped diameter intermediate the gland. The seal actually slides in the gland and when the valve element engages the seal, the seal is contained in the smaller diameter portion of the gland, thus providing radial squeeze and a resultant seal. When the seal retaining sleeve engages the seal, the seal is contained in the enlarged diameter portion of the gland, relieving the seal squeeze and thereby allowing the seal to readily slide laterally.

In the preferred embodiment, a poppet head is added to the valve element which engages a valve seat at the terminus of the bore housing the valve element. This poppet head and seat act as a separate and independent valve. Both the poppet valve and the radial valve are actuated by differential pressure across the valve to provide a dual check valve, one employing a radial, resilient seal and the other a metal-to-metal poppet and seat arrangement. The object of this invention is to protect the resilient seal from washout and resultant wear or damage to ensure long term zero leakage performance of the sealing surfaces.

BRIEF DESCRIPTION OF THE DRAWINGS

FIGS. 1 thru 5 are enlarged sectional plan views of the soft seat valve shown in the preferred embodiment of a check valve, with portions of the end fittings of the valve cut off, reflecting sequential steps of operation from full close in FIG. 1 to full open in FIG. 5; and FIG. 6 is an enlarged view of the resilient seal gland portion of the valve body with the seal removed but the valve element in place.

DETAILED DESCRIPTION

Figure 1:
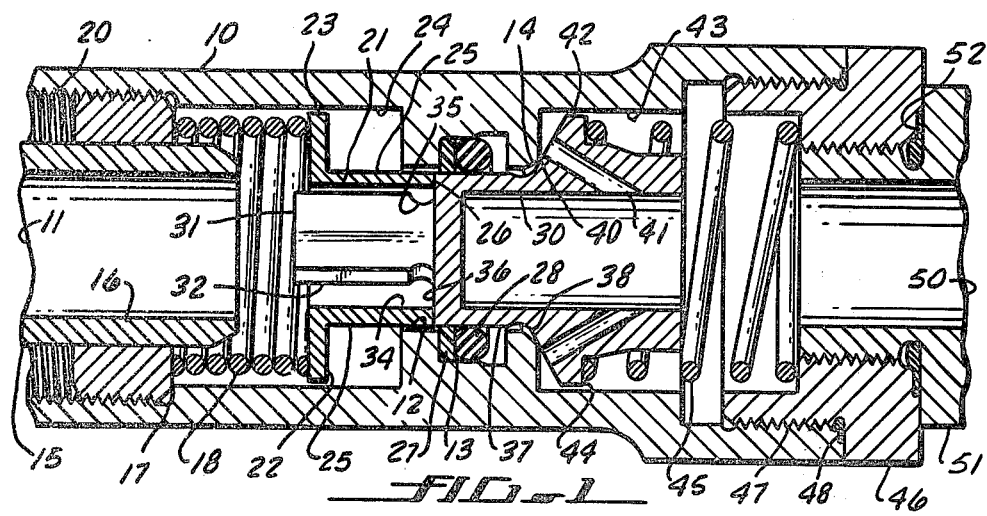

As shown in FIGS. 1 thru 5, the valve body 10 has an inlet port 11 which communicates with a reduced bore 12, which contains a gland 13 and terminates on the outgo end in a seat at 14. In normal flow, fluid enters the inlet valve port 11 via the extended male fitting 15, which is partially cut off to better show, in enlarged size, the moving parts of the valve. It is well recognized that any one skilled in the art can readily adapt the valve and fittings to the peculiar needs of the application e.g. male or female fittings. However, as shown, the male-to-male end fitting has an extended portion 16, which slips through the spring retainer 17 to partially shroud the spring 18 and prevent washout of the spring 18 during high fluid flows. The balance of the fitting 15 is conventional in that the threaded portion engages the thread 20 in the body 10 in spaced relationship to the spacer 17 when fully engaged. A gasket seal is employed between the hexagonal portion (not shown) of the fitting 15 and the valve body 10. A shoulder portion 22 of the seal retaining sleeve 21 acts as a stop to limit the movement of the sleeve 21. Seal retaining sleeve 21 is guided for sliding motion by the flange diameter 23 in the housing bore 24 and the sleeve diameter 25 in the bore 12. Retaining sleeve 21 is further sized so that when the valve is in the fully closed position as in FIG. 1, the axial displacement is such that the sleeve end 26 rests just short of the gland opening 13 in the valve body 10. During axial restraint of the sleeve 21 in the opposite direction, which occurs when the valve is in the full open position as in FIG. 5, the sleeve end 26 is approximately aligned with the end of the gland 13. Hence, full axial displacement of the retaining sleeve 21 is from no engagement in the closed valve or checked position to full engagement of the back-up ring 27 and the o-ring seal 28 by the sleeve portion 25 of the retaining sleeve 21 in the full open or free flow position. In summary, the sleeve end 26 of the seal retaining sleeve 21 is biased by the spring 18 to engage the valve element 30 during the closed or checked flow valve position. Valve element 30 has a three-fluted end piece 31 with the flutes spaced 120° apart, having outer surfaces which scribe a circle and slidably engage the inside diameter 34 of the seal retaining sleeve 21 and terminates in the relief 35. This portion of the valve element 30 is not critical in configuration so long as it provides radial support of the end portion of the valve element 30 within the inside diameter of the retaining sleeve 21 and also provides a free flow passage to the relief 35. Contiguous to the three-fluted end portion relief 35 is the shoulder 36 which terminates in the valve diameter 37. Valve diameter 37 forms the radial seal surface engaging the back-up ring 27 and the o-ring 28 when the valve is in the closed or checked position as in FIG. 1. The diameter 37 terminates in a seat relief at 38 and the relief runs out into a conical surface which forms a poppet head 40. A portion of the poppet head 40 engages the valve seat 14 in the body 10 to form a secondary seal. The poppet head 40 contains a plurality of holes as at 41 to provide free fluid passage when the valve is in the open position. The conical surface of the poppet head 40, in turn, terminates in a poppet diameter 42, which slidably engages and is supported by the larger bore 43 in the valve body 10. The valve element 30 is biased so that the conical surface of the poppet head 40 engages the valve seat 14 of the valve body 10 and the valve diameter 37 engages the back-up ring 27 and the o-ring seal 28 by the poppet spring 45. The biasing poppet spring engages the valve element at 44 and is reacted by the poppet spring retainer 46. The poppet spring retainer 46 threadably engages the valve body 10 at 47 and is provided with a suitable fitting 51 and a gasket seal at 52. Again, the fitting 51 is adaptable by one skilled in the art to the particular needs of the application.

Dimensions of the valve element 30 are controlled such that when the conical surface of the poppet head 40 engages the seat 14 of the body 10, the end of the valve diameter surface 37, as at the shoulder 36, is just past full engagement of the gland 13 containing the back up ring 27 and the o-ring seal 28. The biasing force of the poppet spring 45 is slightly greater than the biasing force of the spring 18 with a resultant net force directed to maintain the valve in a closed or checked position. Difference in force between the two biasing springs 18 and 45 determines the cracking pressure required to open the valve, i.e. the upstream pressure must exceed the downstream pressure by an amount which when multiplied by the area of the valve element projected at the diameter 37 produces a force which exceeds the resultant force of the two opposing springs plus friction forces.

Figure 2:
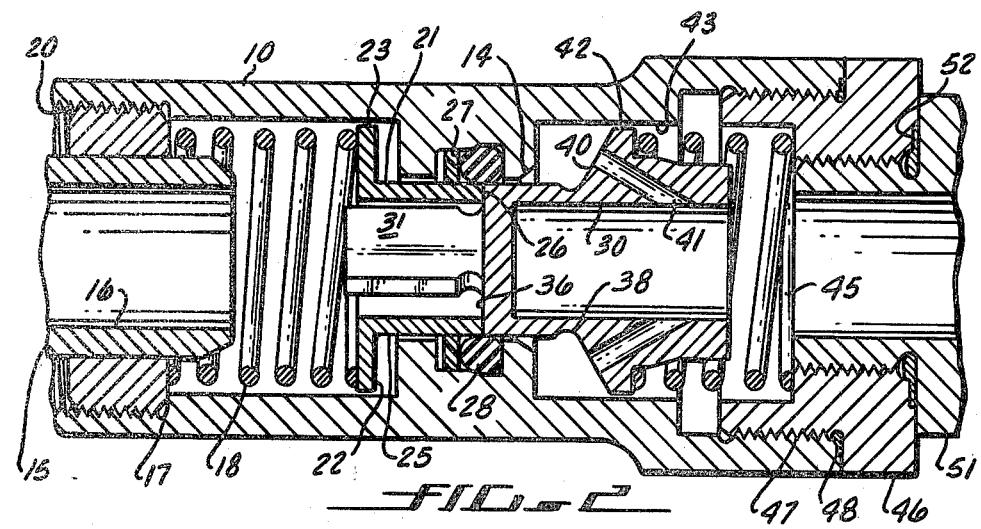

It should now be reasonably clear that as the valve opens by increased upstream pressure, the valve element 30 and the seal retaining sleeve 21 act as a single unit, with matching diameters biased into contacting engagement by the springs 18 and 45 to permit the seals 27 and 28 to shift sealing contact from the valve element 30 to the retainer sleeve 21. FIG. 2 shows the valve just beginning to open. The poppet head 42 has moved away from engagement with the seat 14 and the o-ring seal 28 has been moved in its gland by the friction force of the moving valve element 30. The o-ring 28 is shown at the mid-point of the transfer contacting both the valve diameter 37 of the valve element 30 and the sleeve portion 25 of the retaining sleeve 21.

The mechanics of the seal transfer are, of course, critical to the valve function. An enlarged view of the gland 13 provided in the valve body 10 with the o-ring 28 and the back-up ring 27 removed is shown in FIG. 6. The mating valve portion is shown centered with respect to the diameter of the gland 13 and is identified as 53 inasmuch as it could be either the valve diameter portion 37 of the valve element 30 or the sleeve diameter 25 of the seal retaining sleeve 21. Satisfactory cycle life of the resilient o-ring seal 28 is achieved by properly relieving the squeeze on the o-ring at the point of transfer from the valve element 30 to the retaining sleeve 21. Beginning with a gland 13, whose width is nominally two times the cross sectional diameter of the o-ring 28, the squeeze is alleviated by enlarging the diameter of approximately one half of the width of the gland as at 54. The relief produces a clearance at 55 which is equal to 90 to 100% of the o-ring cross sectional diameter. Further, a generous radius 56 is employed at the transition step between the diameters of the gland 13.

Figure 3:
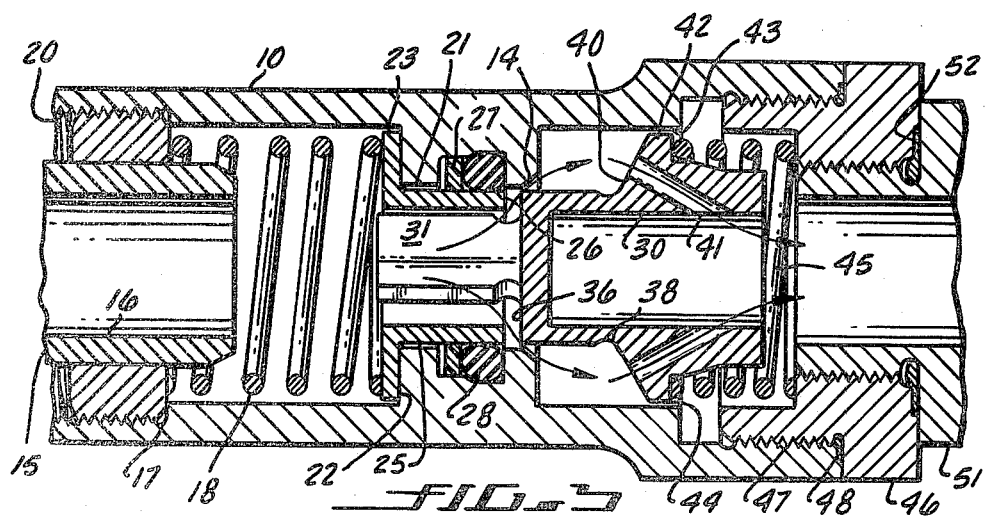

FIG. 3 shows the valve just beginning to crack, allowing fluid flow, as indicated by the arrows. At this point the o-ring 28 is totally contained or shielded by the retainer sleeve 21. FIGS. 4 and 5 show the valve element 30 in further open and full open positions.

Obviously, the reverse sequence occurs in closing the valve beginning with FIG. 5 thru the full close position in FIG. 1.

While the embodiment described above is that of a dual element check valve, the radial sealing element can be employed in any spool type valve regardless of the means employed for actuation. Further, this invention is not limited to the embodiments disclosed above, and all changes and modifications thereof not constituting deviations from the spirit and scope of this invention are intended to be included.

I claim:
1. A valve comprising:
   valve body having a bore and an inlet and outlet port;
   gland located in said bore said gland having a stepped diameter longitudinally positioned intermediate said gland opening with the larger diameter positioned toward said outlet port;
   resilient seal means located in said seal gland;
   valve element, cylindrically shaped and having a first diameter portion smaller than the diameter of said bore, a second diameter portion sized to clear said bore and to slidably fit in said resilient seal means and a step between said first and second diameter portions, said valve element mounted for axial movement in said bore with said second diameter portion positioned toward said outlet port, slidably engaging said bore, and circumscribed by said resilient seal means during a portion of the axial travel of said valve element;
   fluid passage means provided in said first diameter portion of said valve element;
   first stop means to limit through movement of said valve element;
   first spring means biasing said valve element into said bore and in a direction to engage said first stop means;
   seal retaining sleeve having a cylindrical sleeve portion with an outer diameter corresponding to said second diameter of said valve element, forming an extension thereof, circumscribed by said resilient seal means during a portion of the axial travel of said seal retaining sleeve, said sleeve terminating in end portions and having an aperture therethrough, said seal retaining sleeve axially disposed and slidably supported in said inlet end of said bore, with said aperture receiving and enveloping said first diameter of said valve element and said end portion of said seal retaining sleeve abutting said step between said first and said second diameter of said valve element;

second stop means to limit the movement of said seal retaining sleeve;

second spring means biasing said seal retaining sleeve into contact with said step between said first and second diameters of said valve element; and operating means so as to operate the valve between open and closed positions whereby the seal resides in the enlarged portion of the gland and circumscribes the seal retaining sleeve when the valve is in the open position and the seal resides in the reduced portion of the gland and circumscribes the valve element when in the closed position.

2. A valve as recited in claim 1 further comprising:

first chamber larger than, aligned with, and located contiguous to said outlet port end of said bore;

valve seat axially located in said outlet port end of said bore; and wherein said first stop means comprises a poppet head attached to the end portion of said second diameter portion of said valve element whereby said poppet head engages said valve seat when said second diameter is enveloped by said resilient seal means located in said small diameter portion of said gland and said operating means is differential pressure across said bore.

3. A valve as recited in claim 2, in which the resilient sealing means comprises a back-up ring and an o-ring.

* * * * *